Dec. 19, 1939.  L. M. BETTS  2,183,803
BRAKE CONTROL MECHANISM
Filed Aug. 15, 1938
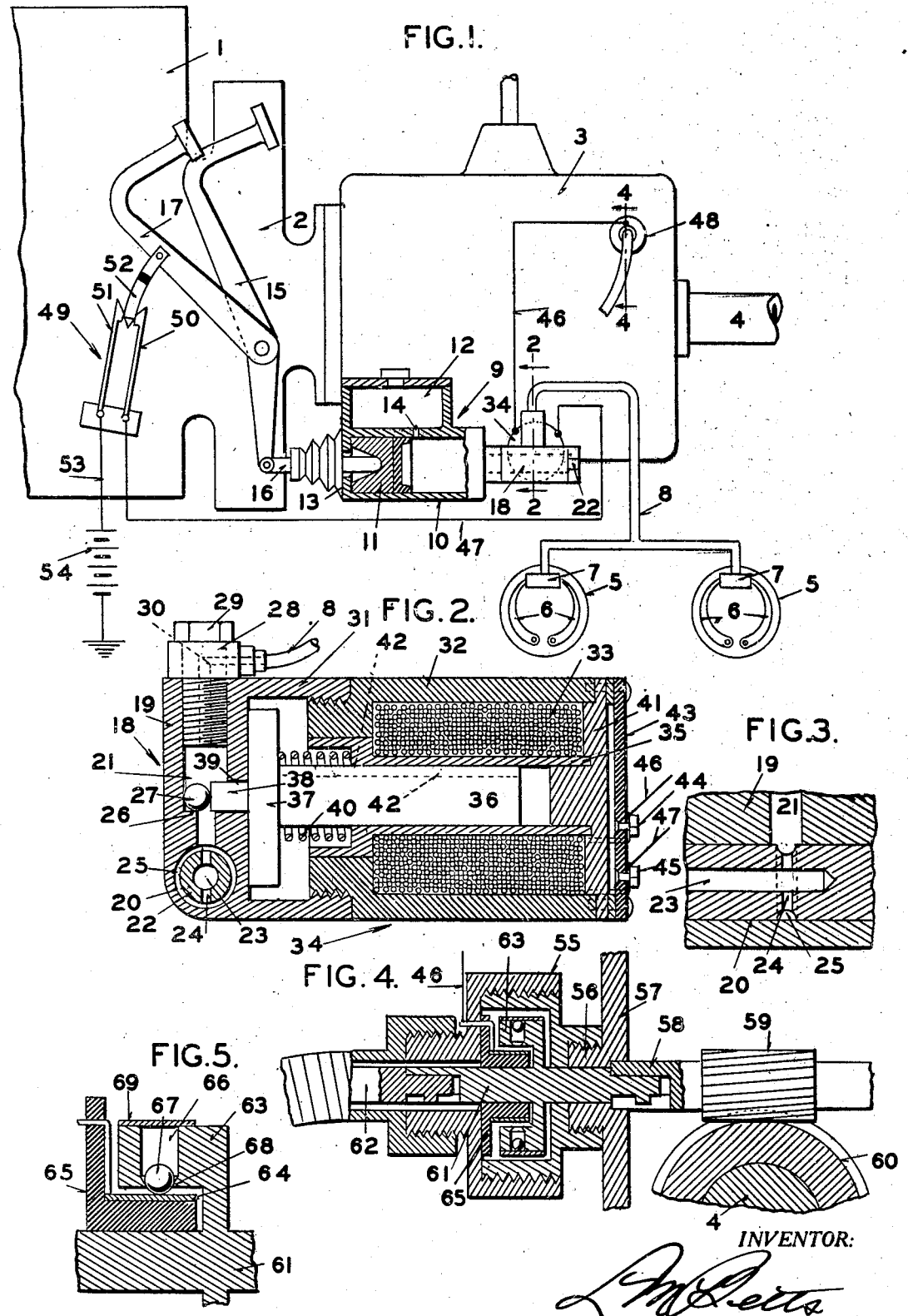
INVENTOR:
L. M. Betts Patented Dec. 19, 1939

2,183,803

UNITED STATES PATENT OFFICE 2,183,803

BRAKE CONTROL MECHANISM

Laurance M. Betts, Seattle, Wash., assignor to Wagner Electric Corporation, St. Louis, Mo., a corporation of Delaware Application August 15, 1938, Serial No. 224,919

14 Claims. (Cl. 192—13)

My invention relates to braking apparatus and more particularly to control means therefor whereby the operator can hold the brakes applied under certain conditions and without the use of the usual brake pedal.

One of the objects of my invention is to provide means in a vehicle braking system for preventing release of the brakes from applied position and which is controlled by speed responsive means operated by a rotatable member connected to the vehicle wheels.

Another object of my invention is to provide a control for vehicle brake holding means which will cause said holding means to be effective only when the speed of the vehicle is below a predetermined value and the clutch mechanism is in disengaged position.

Still another object of my invention is to provide electrically-controlled means for holding vehicle brakes applied and to govern the operation of said means by both a manually-controlled switch and a switch controlled by a speed responsive device connected to the wheels of the vehicle.

Other objects of my invention will become apparent from the following description taken in connection with the accompanying drawing in which Figure 1 is a view, partly in section, showing my invention associated with the vehicle braking apparatus and the vehicle driving mechanism; Figure 2 is a cross-sectional view taken on the line 2—2 of Figure 1 and showing the brake holding valve; Figure 3 is a cross-sectional view of a portion of the structure of Figure 2 showing a detail thereof; Figure 4 is a cross-sectional view taken on the line 4—4 of Figure 1 and showing the speed responsive controlled switch; and Figure 5 is an enlarged view of a detail of the switch shown in Figure 4.

Referring to the drawing wherein a preferred embodiment of my invention is disclosed, the numeral 1 indicates an engine of a motor vehicle which is connected to drive the wheels of the vehicle by means of the usual clutch 2, the change speed gearing 3 and the propeller shaft 4, the latter being connected to the wheels through suitable differential gears and axles. The wheels of the vehicle are provided with brakes 5 (diagrammatically shown) the shoes 6 of which are actuated by fluid motors 7 connected by a conduit 8 to a source of pressure shown as a compressor 9. This compressor is commonly known as a master cylinder and comprises a cylinder 10, a reciprocable piston 11 and a reservoir 12. The piston is normally biased to a retracted position (brakes off) against a stop 13. When in this position the cylinder is connected to the reservoir by the usual compensating porthole 14. The piston is adapted to be actuated by the brake pedal 15 which is connected to the piston by a piston rod 16. The vehicle is also provided with a clutch pedal 17 whereby the clutch may be disengaged and permitted to re-engage when required as, for example, in shifting gears and starting and stopping the vehicle.

In accordance with my invention I provide a check valve device 18 between the master cylinder 9 and the conduit 8 leading to the fluid motors of the brakes 5. This check valve device is, under certain conditions, capable of preventing fluid from returning to the master cylinder, thus causing the brakes to be held applied in the event they have already been applied. The vehicle operator is thus permitted to remove his foot from the brake pedal and to employ it for other purposes such as accelerating or starting the engine.

As shown in Figures 2 and 3, the valve device 18 comprises a casing 19 having a through passage 20 communicating with a vertical passage 21. The passage 20 receives a bolt 22 which is screwed into the end of cylinder 10 of the master cylinder for attaching the casing thereto. As best shown in Figure 3, the bolt is provided with a passage 23, cross passage 24 and a circular groove 25 whereby the cylinder can communicate with the vertical passage 21. Within passage 21 is a valve seat 26 and cooperating therewith is a ball valve 27 which, when seated, will prevent fluid from flowing from the upper part of passage 21 to the master cylinder but is free to be pushed off its seat by fluid and thus permit fluid to flow in the opposite direction. The upper end of passage 21 is connected to conduit 8 leading to the fluid motors of the brakes, the connection comprising a fitting 28 attached to the casing by a bolt 29 having a passage 30 therein.

The casing 19 containing the valve is of non-magnetic material such as brass and formed with a cylindrical threaded flange 31 into which is screwed a cylindrical casing 32 for housing the winding 33 of a solenoid 34. The winding surrounds a sleeve 35 preferably of brass within which is reciprocable the armature 36 having a head 37 positioned in the cylindrical flange 31 of casing 18. The head of the armature carries a pin 38 of brass or other non-magnetic material projecting through an opening 39 in the wall of casing 18 and positioned adjacent the ball 27.

The pin is of such length that it holds the ball off its seat when the armature is in its released position, to which position it is normally biased by a spring 40 as shown in Figure 2.

The solenoid casing 32 is sealed by a plate 41 having a central portion extending into the sleeve 35 and acting as a stop for limiting the movement of the armature when the solenoid is energized. The casing 32, the armature 36 and plate 41 are all made of magnetic material and the winding is so proportioned that sufficient magnetic lines of force are present to move the armature to the right against the action of spring 40. The spring is of sufficient strength to unseat ball 27 against the maximum fluid pressure which may be held in the brake lines. The armature of the solenoid is lubricated by the brake fluid and a groove 42 is provided in the armature to prevent fluid from being trapped between it and plate 41. A fiber plate 43 carries binding posts 44 and 45 to which the ends of the conductors 46 and 47 are connected.

The control means for the solenoid comprises a speed responsive switch 48 and a manually-controlled switch 49 which in the embodiment shown is operated by the clutch pedal. The conductor 46 leading from the solenoid is connected to the speed responsive switch and the conductor 47 to the clutch-operated switch. The switch 49 is shown as comprising two spring blades 50 and 51 normally spaced apart which are adapted to be electrically connected together by a third blade 52 carried by the clutch pedal but insulated therefrom. The switch is adapted to be closed only when the clutch pedal is moved to clutch disengaged position as shown in Figure 1. The blade 50 is connected to the conductor 47 and the blade 51 to a conductor 53 leading to the battery 54 which is grounded to the vehicle frame.

Referring specifically to Figures 4 and 5, the speed responsive switch 48 is enclosed in a casing 55 screwed onto a boss 56 on the change speed gearing housing 57. The usual speedometer take-off shaft 58 has one end journaled in boss 56 and is driven by worm gears 59 and 60, the latter being carried by the portion of the propeller shaft 4 which lies in the gearing housing. Within casing 55 is a central rotatable member 61, one end of which is connected to the take-off shaft 58 and the other end to the usual speedometer drive cable 62 leading to the speedometer. The rotatable member 61 is provided with a cylindrical portion 63 which surrounds a copper sleeve 64 supported by a fiber member 65 secured to casing 55. The copper sleeve is connected to conductor 46 leading from the solenoid. The wall of the cylindrical portion 63 is provided with a plurality of radial holes 66 in which are positioned balls 67. The inner ends of the holes adjacent the copper sleeve are formed with tapered flanges 68 upon which the balls rest when they are capable of being positioned at these ends of the holes by the action of gravity. The balls make contact with the copper sleeve when they are positioned in the inner ends of the holes, thus establishing a circuit between the sleeve and ground by way of the rotatable member 61 and the gearing casing. A sleeve 69 retains the balls in their holes.

It is to be noted that the speed responsive switch is so constructed that it can be installed by merely removing the speedometer cable, screwing the casing 55 onto boss 56 and then attaching the cable to housing 55. The balls 67 are free to be thrown out of contact with the copper sleeve by the rotation of the rotatable member 61 and centrifugal force will continue to hold them out until the speed of the vehicle falls to approximately two miles per hour. After centrifugal action ceases to be effective, the tapered flanges 68 at the inner ends of holes 66 delay movement of the balls to the position where they contact with the copper sleeve.

In operation, when the vehicle is moving, the electrical circuit will be open since, under these conditions, the balls 67 will be out of contact with the copper sleeve. This condition will prevail regardless as to whether the clutch-operated switch is closed or open. Under these conditions the ball valve 27 will be held off its seat 26 by spring 40 since the solenoid is de-energized, and the brakes may be applied and released by the brake pedal at will.

If the vehicle should be brought to a stop with the clutch disengaged, the switch 49 will be closed and also the speed responsive switch. The electrical circuit will be closed and the solenoid energized to move the armature to the right. The ball valve 27 is now free to become seated to prevent fluid from flowing from the brake fluid motors to the master cylinder. Thus the brakes will be held applied and the operator need not continue to hold his foot on the brake pedal. If the brakes have not been applied prior to the ball valve becoming seated, they are not prevented from being applied since application of pressure to the fluid in the master cylinder will cause the ball valve to be unseated and allow fluid under pressure to flow toward the brake fluid motors.

When it is desired to start the vehicle, the operator will re-engage the clutch, thus causing the switch 49 to be opened and the solenoid de-energized. Spring 40 will then move the armature and cause pin 38 to move the ball valve off its seat, thereby permitting fluid to return to the master cylinder and thus release the brakes. The release of the brakes will be substantially simultaneous with the engagement of the clutch.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a motor vehicle provided with clutch mechanism and clutch operating means and with braking apparatus, means for holding the brakes applied, control means therefor comprising an element actuated by the clutch operating means and a rotatable element responsive to the speed of the vehicle and preventing said holding means from being effective when the vehicle speed is in excess of a predetermined rate.

2. In a motor vehicle provided with clutch mechanism and with braking apparatus, normally inoperative means for preventing release of the brakes from applied position, means for causing same to be operative, said means comprising a device responsive to the speed of the vehicle and additional means operable when the clutch mechanism is in clutch-disengaged position.

3. In a motor vehicle provided with clutch mechanism and braking apparatus, normally inoperative means for holding the brakes applied, control means for rendering the holding means operative and comprising means controlled by the clutch mechanism and additional means ineffective when the speed of the vehicle is above a predetermined rate.

4. In a motor vehicle provided with fluid braking apparatus comprising a source of pressure and a fluid motor connected thereto by means of a conduit, valve means associated with the conduit for preventing return flow of fluid from the motor, and control means for said valve adapted to maintain the valve in inoperative position when the speed of the vehicle exceeds a predetermined rate, said control means comprising a rotatable element whose rate of rotation is determined by the speed of the vehicle.

5. In a motor vehicle provided with driving means for the wheels thereof, with clutch mechanism for disconnecting the driving means from the wheels and with braking apparatus having operator-operated means for applying and releasing the brakes, means other than said operator-operated means for holding the brakes applied, and control means for said holding means comprising a rotatable element responsive to vehicle speed and means controlled by the clutch operating mechanism, said last named means being operative when the clutch operating mechanism is in clutch-disengaged position and inoperative when the clutch operating mechanism is in clutch-engaged position.

6. In a motor vehicle provided with braking apparatus, means for holding the brakes applied, a solenoid for controlling said holding means, and a control circuit for said solenoid comprising a switch responsive to the speed of the vehicle and so controlling the solenoid that the holding means will be ineffective when the vehicle speed is in excess of a predetermined rate.

7. In a motor vehicle provided with braking apparatus, means for holding the brakes applied, a solenoid for controlling said holding means, and a control circuit for said solenoid comprising a manually-controlled switch and a switch responsive to the speed of the vehicle and so controlling the solenoid that the holding means will be ineffective when the vehicle speed is in excess of a predetermined rate.

8. In a motor vehicle provided with driving clutch mechanism and with braking apparatus, means for holding the brakes applied, a solenoid for controlling said holding means, and a control circuit for said solenoid comprising a switch operated by the clutch operating means and a switch responsive to the speed of the vehicle.

9. In a motor vehicle provided with fluid pressure braking apparatus, valve means for holding the brakes in applied position, means biasing said valve to inoperative position, a solenoid for rendering the biasing means ineffective, and a solenoid control circuit embodying a switch responsive to the speed of the vehicle and so controlling the solenoid that the valve means will be ineffective to hold the brakes in applied position when the vehicle speed is in excess of a predetermined rate.

10. In a motor vehicle provided with braking apparatus comprising a manually-controlled member, a brake actuator for the brake and force transmitting means whereby the manually-controlled member can operate the actuator, means cooperating with the force transmitting means for holding the brakes applied, and control means for the holding means and operable independently of the condition of the prime mover of the vehicle, said control means comprising a rotatable element responsive to the speed of the vehicle and preventing said holding means from being effective when the vehicle speed is in excess of a predetermined rate.

11. In a motor vehicle provided with a clutch mechanism and clutch operating means and with fluid pressure braking apparatus comprising a source of pressure and a fluid motor connected thereto by means of a conduit, valve means associated with the conduit for preventing return flow of fluid from the motor, and control means for said valve comprising an element actuated by the clutch operating means and a rotatable element responsive to the speed of the vehicle and preventing said valve means from being effective when the vehicle speed is in excess of a predetermined rate.

12. In a motor vehicle provided with braking apparatus, means for holding the brakes applied, and electrical means for controlling said holding means and comprising a switch responsive to the speed of the vehicle, said switch adapted to be closed when the speed of the vehicle is below a predetermined rate and to thereby cause said electrical means to permit the brake holding means to be operative.

13. In a motor vehicle provided with fluid braking apparatus comprising a source of pressure and a fluid motor connected thereto by means of a conduit, valve means associated with the conduit for preventing return flow of fluid from the motor, and electrical means for controlling said valve and comprising a switch responsive to the speed of the vehicle, said switch adapted to be closed when the speed of the vehicle is below a predetermined rate and to thereby cause said electrical means to permit the valve to be operative.

14. In a motor vehicle provided with clutch mechanism and with fluid braking apparatus comprising a source of pressure and a fluid motor connected thereto by means of a conduit, valve means associated with the conduit for preventing return flow of fluid from the motor, and electrical means for controlling said valve and comprising a switch responsive to the speed of the vehicle and a second switch controlled by the clutch mechanism, said speed responsive switch being closed when the speed of the vehicle is below a predetermined rate and said second switch being closed when the clutch mechanism is in clutch disengaged position.

LAURANCE M. BETTS.